US008965352B2

(12) United States Patent
Zhang et al.

(10) Patent No.: US 8,965,352 B2
(45) Date of Patent: Feb. 24, 2015

(54) DEVICE WITH REDUCED COMMUNICATION-PROTOCOL TRANSITION TIME

(71) Applicant: Apple Inc., Cupertino, CA (US)

(72) Inventors: Wanping Zhang, San Jose, CA (US); Tahir Shamim, San Jose, CA (US); Swaminathan Balakrishnan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/683,959

(22) Filed: Nov. 21, 2012

(65) Prior Publication Data

US 2014/0073307 A1    Mar. 13, 2014

Related U.S. Application Data

(60) Provisional application No. 61/699,040, filed on Sep. 10, 2012.

(51) Int. Cl.

| | | |
|---|---|---|
| *H04M 3/00* | (2006.01) | |
| *H04M 1/00* | (2006.01) | |
| *H04W 36/00* | (2009.01) | |
| *H04B 1/16* | (2006.01) | |
| H04W 4/00 | (2009.01) | |
| *G08C 17/00* | (2006.01) | |
| *H04W 80/00* | (2009.01) | |

(52) U.S. Cl.
CPC .................................... *H04W 80/00* (2013.01)
USPC ..... 455/418; 455/343.2; 455/436; 455/552.1; 370/311; 370/331

(58) Field of Classification Search
CPC ..... H04W 36/00; H04W 36/14; H04W 36/24; H04W 36/34; H04W 36/36; H04W 48/18; H04W 52/00; H04W 52/02; H04W 52/0209; H04W 52/0274; H04W 52/028; H04W 80/00; H04W 88/02; H04W 88/06
USPC ................... 455/404.1, 558, 435.2, 574, 551, 455/436–444, 432.1, 525, 456.3, 455/552.1–553.1, 343.2–343.5; 370/310, 370/345, 254, 351, 328, 331–334, 338, 353, 370/401
See application file for complete search history.

(56) References Cited

U.S. PATENT DOCUMENTS

| | | |
|---|---|---|
| 7,593,365 B1 * | 9/2009 | Delker et al. ................ 370/328 |
| 2008/0056214 A1 * | 3/2008 | Low et al. ..................... 370/338 |

(Continued)

*Primary Examiner* — Michael Mapa
(74) *Attorney, Agent, or Firm* — Park, Vaughan, Fleming & Dowler LLP; Steven E. Stupp

(57) ABSTRACT

In order to reduce the time delay when transitioning between different communication protocols used to communicate information via a cellular-telephone network, an electronic device (such as a cellular telephone) may only partially disable a software stack associated with a current communication protocol. In particular, after receiving an indicator that there is a message to be communicated using a second communication protocol while the electronic device is currently configured to communicate using a first communication protocol, the electronic device may disable a portion of a software stack associated with the first communication protocol and may enable a software stack associated with the second communication protocol. Then, the electronic device communicates the message using the second communication protocol. Next, the electronic device: may disable the software stack associated with the second communication protocol and may enable the portion of the software stack associated with the first communication protocol.

21 Claims, 4 Drawing Sheets

(56) References Cited

U.S. PATENT DOCUMENTS

| | | | |
|---|---|---|---|
| 2010/0297979 A1* | 11/2010 | Watfa et al. | 455/404.1 |
| 2011/0059739 A1* | 3/2011 | Huang | 455/435.1 |
| 2011/0207458 A1* | 8/2011 | Tanaka et al. | 455/435.1 |
| 2011/0317661 A1* | 12/2011 | Tenny | 370/331 |
| 2012/0182912 A1* | 7/2012 | Watfa et al. | 370/311 |

* cited by examiner

DEVICE WITH REDUCED COMMUNICATION-PROTOCOL TRANSITION TIME

CROSS REFERENCE TO RELATED APPLICATION

This application claims priority under 35 U.S.C. §119(e) to U.S. Provisional Application Ser. No. 61/699,040, entitled "Device with Reduced Communication-Protocol Transition Time," by Wanping Zhang, Tahir Shamim, and Swaminathan Balakrishnan, filed on Sep. 10, 2012, the contents of which is herein incorporated by reference.

BACKGROUND

1. Field

The described embodiments relate to techniques for communicating information.

2. Related Art

The increasing functionality and popularity of electronic devices, such as cellular telephones, has resulted in demand for significantly higher data rates. For example, many software applications that execute on these electronic devices provide rich user experiences by receiving and transmitting large amounts of information with other electronic devices.

Many electronic devices are capable of communicating information using a variety of communication protocols, such as: Long Term Evolution or LTE (e.g., LTE 4G or LTE Advanced from the $3^{rd}$ Generation Partnership Project in Asia, Europe and North America), Universal Mobile Telecommunications System (UMTS), Wi-Fi (and, more generally, a communication protocol compatible with one or more of the Institute of Electrical and Electronics Engineers (IEEE) standards 802.11), Bluetooth™ (from the Bluetooth Special Interests Group of Kirkland, Wash.), etc. However, these electronic devices may not be able of communicating using different communication protocols at the same time.

As a consequence, many electronic devices routinely transition or switch from one communication protocol to another, and then back. However, these transitions can be time-consuming, which is frustrating for users of the electronic devices, and thus can adversely impact sales and customer retention.

SUMMARY

The described embodiments include an electronic device that includes: an antenna; an interface circuit, coupled to the antenna, which communicates information via a cellular-telephone network using a first communication protocol and a second communication protocol; a processor coupled to the interface circuit and the second interface circuit; and memory that stores a program module that is executed by the processor. The program module facilitates management of operation of the electronic device. After the program module receives an indicator that there is a message to be communicated using the second communication protocol while the electronic device is currently configured to communicate using the first communication protocol, the program module disables a portion of a software stack associated with the first communication protocol and enables a software stack associated with the second communication protocol. Then, the program module communicates the message using the second communication protocol. Next, the program module: disables the software stack associated with the second communication protocol and enables the portion of the software stack associated with the first communication protocol.

In this way, the program module transitions communication from the first communication protocol to the second, and back, efficiently. In particular, operations in the program module may be executed by the processor in less time than a channel dormancy time of the cellular-telephone network.

Note that the first communication protocol may include a communication protocol compatible with a fourth-generation cellular-telephone standard, such as Long Term Evolution (LTE). Moreover, the second communication protocol may include a communication protocol compatible with a third-generation cellular-telephone standard, such as 1xRadio Transmission Technology (1xRTT). Furthermore, the message may include a text message, which may be communicated using a Short Message Service (SMS).

In some embodiments, communicating the message involves transmitting the message, and the indicator includes a command received from a user interface in the electronic device. For example, a user of the electronic device may use the user interface to indicate that they want to send a text message. Alternatively, communicating the message may involve receiving the message, and the indicator may include a signal associated with a value stored in a register in the memory that indicates there is an incoming text message.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to reduce the time delay when transitioning between different communication protocols used to communicate information via a cellular-telephone network, an electronic device (such as a cellular telephone) may only partially disable a software stack associated with a current communication protocol. In particular, after receiving an indicator that there is a message to be communicated using a second communication protocol while the electronic device is currently configured to communicate using a first communication protocol, the electronic device may disable a portion of a software stack associated with the first communication protocol and may enable a software stack associated with the second communication protocol. Then, the electronic device communicates the message using the second communication protocol. Next, the electronic device: may disable the software stack associated with the second communication protocol after the message is communicated, and may re-enable the portion of the software stack associated with the first communication protocol.

In this way, the electronic device transitions communication from the first communication protocol to the second, and back, efficiently. In particular, the transition to (or from) the different communication protocols may take less time than a channel dormancy time of the cellular-telephone network. This may reduce user frustration and improve the user experience when using the electronic device.

In the discussion that follows, the first communication protocol may include a communication protocol that is compatible with a fourth-generation cellular-telephone standard, such as Long Term Evolution or LTE (e.g., LTE 4G or LTE Advanced from the $3^{rd}$ Generation Partnership Project in Asia, Europe and North America). Moreover, the second communication protocol may include a communication protocol compatible with a third-generation cellular-telephone standard (e.g., International Mobile Telecommunications-2000 specifications by the International Telecommunication Union of Geneva Switzerland), such as 1xRadio Transmission Technology (1xRTT), 1xEvolution-Data Optimized (1xEV-DO), Universal Mobile Telecommunications System (UMTS), or Wideband Code Division Multiple Access (WCDMA). Furthermore, the message may include a text message, which may be communicated using a Short Message Service (SMS). However, these are illustrative examples, and the communication technique can be used with a variety of communication protocols.

Figure 1:
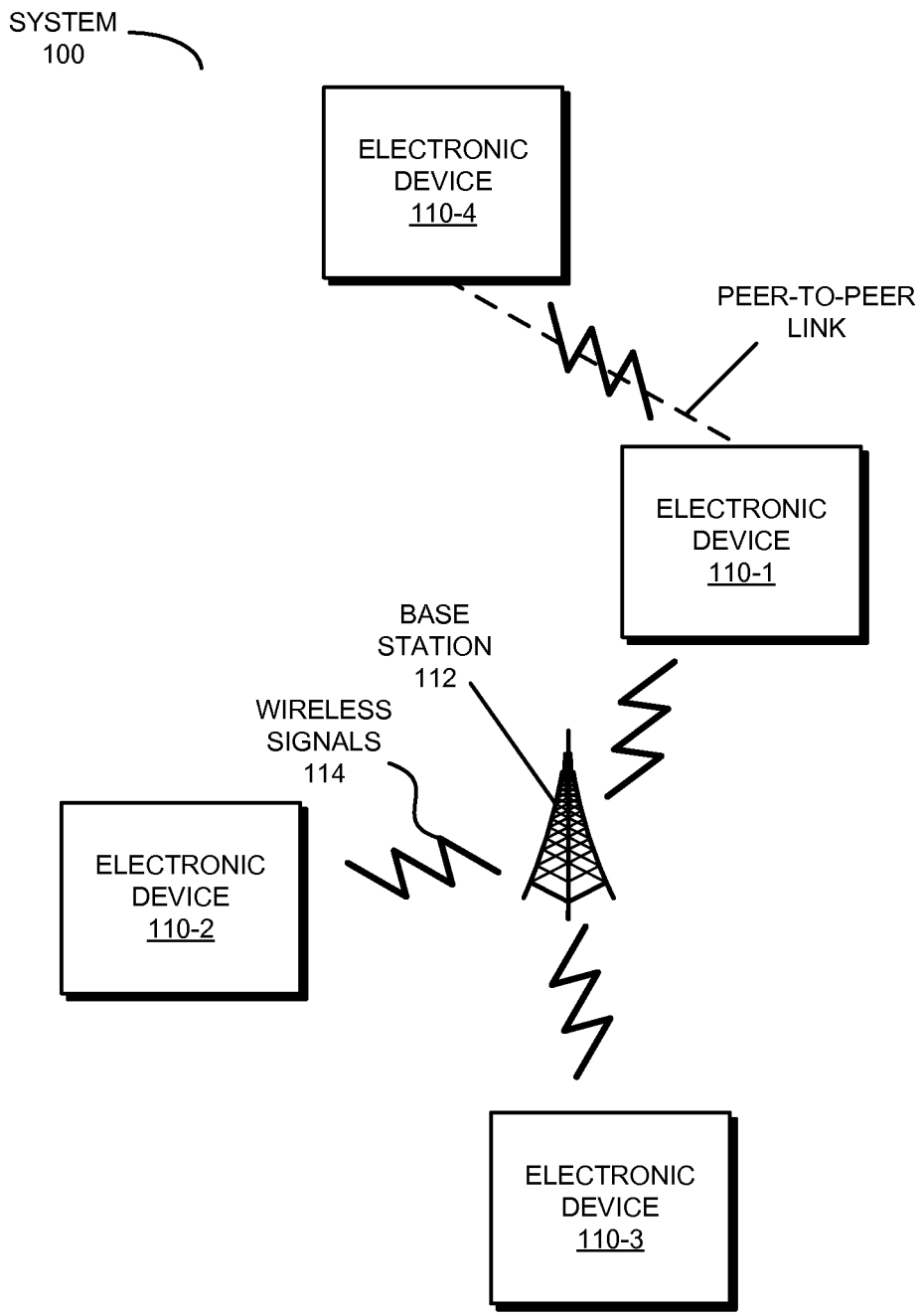
FIG. 1 is a block diagram illustrating electronic devices wirelessly communicating in accordance with an embodiment of the present disclosure.

The communication between the electronic devices is shown in FIG. 1, which presents a block diagram illustrating electronic devices 110 wirelessly communicating. In particular, these electronic devices may wirelessly communicate via a cellular network (using UMTS, LTE, etc.), a wireless local area network such as Wi-Fi (and, more generally, a network compatible with one or more of the Institute of Electrical and Electronics Engineers (IEEE) standards 802.11), a Bluetooth™ (from the Bluetooth Special Interests Group of Kirkland, Wash.) network, and/or another type of wireless network. For example, the wireless communication may involve communicating information via an established wireless network, such as via a base station 112. Alternatively, the wireless communication may involve electronic devices 110: discovering one another by scanning wireless channels; transmitting and receiving advertising frames on wireless channels to enable electronic devices 110 to make initial contact, followed by exchanging subsequent data/management frames (such as connect requests) to establish a connection; configuring security options (e.g., IPSEC); transmitting and receiving packets or frames via the connection; etc.

As described further below with reference to FIG. 4, each of electronic devices 110 may include subsystems, such as a networking subsystem, a memory subsystem and a processor subsystem. In addition, electronic devices 110 may include radios in the networking subsystems. More generally, electronic devices 110 can include (or can be included within) any electronic devices with the networking subsystems that enable electronic devices 110 to wirelessly communicate with another electronic device.

As can be seen in FIG. 1, wireless signals 114 (represented by jagged lines) are transmitted from a radio in electronic device 110-1. These wireless signals 114 are received by radios in one or more of the other electronic devices in FIG. 1, either directly or indirectly (for example, wireless signals 114 may be relayed by base station 112).

In the described embodiments, processing information (such as a packet or frame) in either of electronic devices 110-1 and 110-2 includes: receiving wireless signals 114 with the information; decoding/extracting the information from received wireless signals 114 to acquire the information; and processing the information (such as a command or a payload in a frame or a packet).

Although we describe the network environment shown in FIG. 1 as an example, in alternative embodiments different numbers or types of electronic devices may be present. For example, some embodiments comprise more or fewer electronic devices. As another example, in another embodiment different electronic devices are transmitting and/or receiving information.

The wireless communication capabilities of electronic devices 110 may not be static. For example, electronic device 110-1 may use LTE to communicate data. However, in many electronic devices LTE is currently only used for data communication. As a consequence, when a user of electronic device 110-1 wants to make a voice phone call or when there is an incoming voice phone call, electronic device 110-1 may disable LTE and may enable 1xRTT. After completing the voice phone call, electronic device 110-1 may disable 1xRTT and may enable LTE.

Similar transitions between communication protocols may occur when the user wants to send a text message (i.e., an SMS message) or when there is an incoming text message. When this occurs, electronic device 110-1 may disable LTE and may enable 1xRTT. Then, after communicating the text message, electronic device 110-1 may disable 1xRTT and may enable LTE.

However, these transitions between different communication protocols can be time-consuming, which is frustrating for the user and degrades customer satisfaction. In particular, for a text message, suspending or disabling the LTE software stack can take 400-700 ms, enabling the 1xRTT software stack can take 10-20 ms, communicating the text message can take 5-6 s, disabling the 1xRTT software stack can take 10-20 ms, and enabling the LTE software stack can take 400-700 ms. In total, transitioning to and from 1xRTT may take more than 10 s, which may exceed the Radio Common Carrier (RCC) dormancy time of the cellular-telephone network (and, more generally, a channel dormancy time of the cellular-telephone network).

To address this problem, instead of disabling and enabling the entire LTE software stack, only a portion of the LTE software stack may be disabled and then enabled. This may reduce the 400-700 ms time for these operations to 10-20 ms. In particular, the LTE software stack may include: firmware (such as ML1), radio control (such as an RRC radio), and end-to-end session management (such as non-access stratum or NAS). When disabling LTE, electronic device 110-1 may disable the firmware and the radio control. Moreover, when enabling LTE, electronic device 110-1 may enable the firmware and the radio control. In both of these operations, the end-to-end session management may be left enabled.

Figure 2:
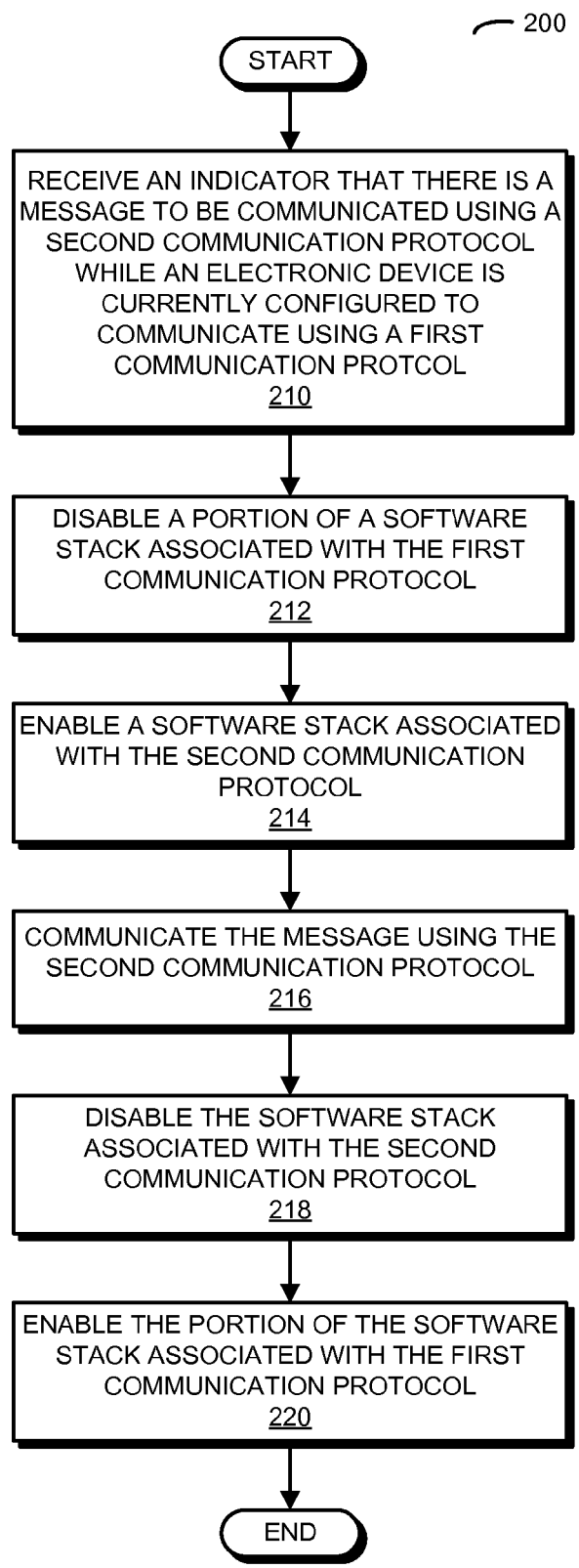
FIG. 2 is a flow diagram illustrating a method for managing operation of an electronic device in accordance with an embodiment of the present disclosure.

This communication technique is shown in FIG. 2, which presents a flow diagram illustrating a method 200 for managing operation of an electronic device, such as electronic device 400 (FIG. 4), which communicates using a first communication protocol (such as LTE) and/or a second communication protocol (such as 1xRTT). During operation, a program module executed by a processor in the electronic device receives (operation 210) an indicator that there is a message to be communicated using the second communication protocol while the electronic device is currently configured to communicate using the first communication protocol. This first communication protocol may communicate information at a higher data rate than the second communication protocol. In addition, the first communication protocol may (or may not) only be used to communicate data.

After the program module executed by the processor receives the indicator, the program module disables a portion of a software stack associated with the first communication protocol (operation 212) so that the communication using the first communication protocol is discontinued, and enables a software stack associated with the second communication protocol (operation 214) so that the electronic device is configured to communicate using the second communication protocol. More generally, in operations 212 and 214, the electronic device may partially disable (in hardware and/or software) communication using the first communication protocol, and may enable (in hardware and/or software) communication using the second communication protocol.

Then, the program module communicates the message using the second communication protocol (operation 216), for example, in conjunction with an interface circuit and an antenna in the electronic device.

Moreover, after the message has been communicated, the program module disables the software stack associated with the second communication protocol (operation 218) so that communication using the second communication protocol is discontinued, and enables the portion of the software stack associated with the first communication protocol (operation 220) so that the electronic device is configured to communicate using the first communication protocol. More generally, in operations 218 and 220, the electronic device may disable (in hardware and/or software) communication using the second communication protocol, and may partially re-enable (in hardware and/or software) communication using the first communication protocol.

In this way, the program module transitions communication from the first communication protocol to the second, and back, efficiently. In particular, operations in the program module may be executed by the processor in less time than a channel dormancy time of the cellular-telephone network.

In an exemplary embodiment, communicating the message involves transmitting the message. In this case, the indicator may include a command received from a user interface in the electronic device. For example, a user of the electronic device may use the user interface to indicate that they want to send a text message. In particular, the user may active an icon on a touchscreen that launches a text-messaging application.

Alternatively, communicating the message may involve receiving the message. In this case, the indicator may include a signal associated with a value stored in a register in the memory that indicates there is an incoming text message. For example, a call-processing module in the electronic device and a call manager may receive a notification via the cellular-telephone network that there is an incoming message. In response, a field in a service-option register may be modified to indicate that there is an incoming voice message, text message and/or data. This change to the service-option register may be detected by the program module, which then performs the other operations in method 200.

Figure 3:
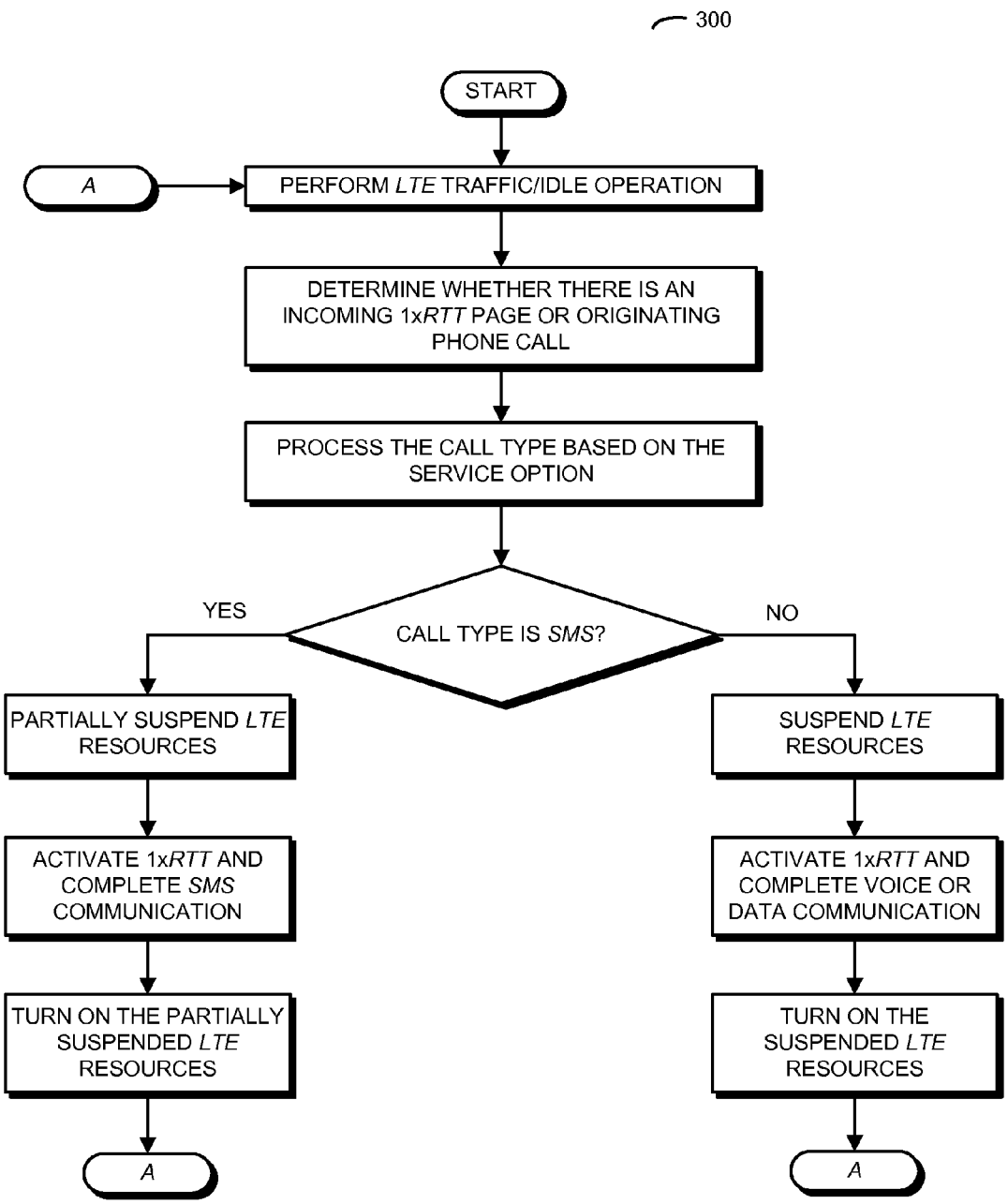
FIG. 3 is a flow diagram illustrating a method for managing operation of an electronic device in accordance with an embodiment of the present disclosure.
Figure 4:
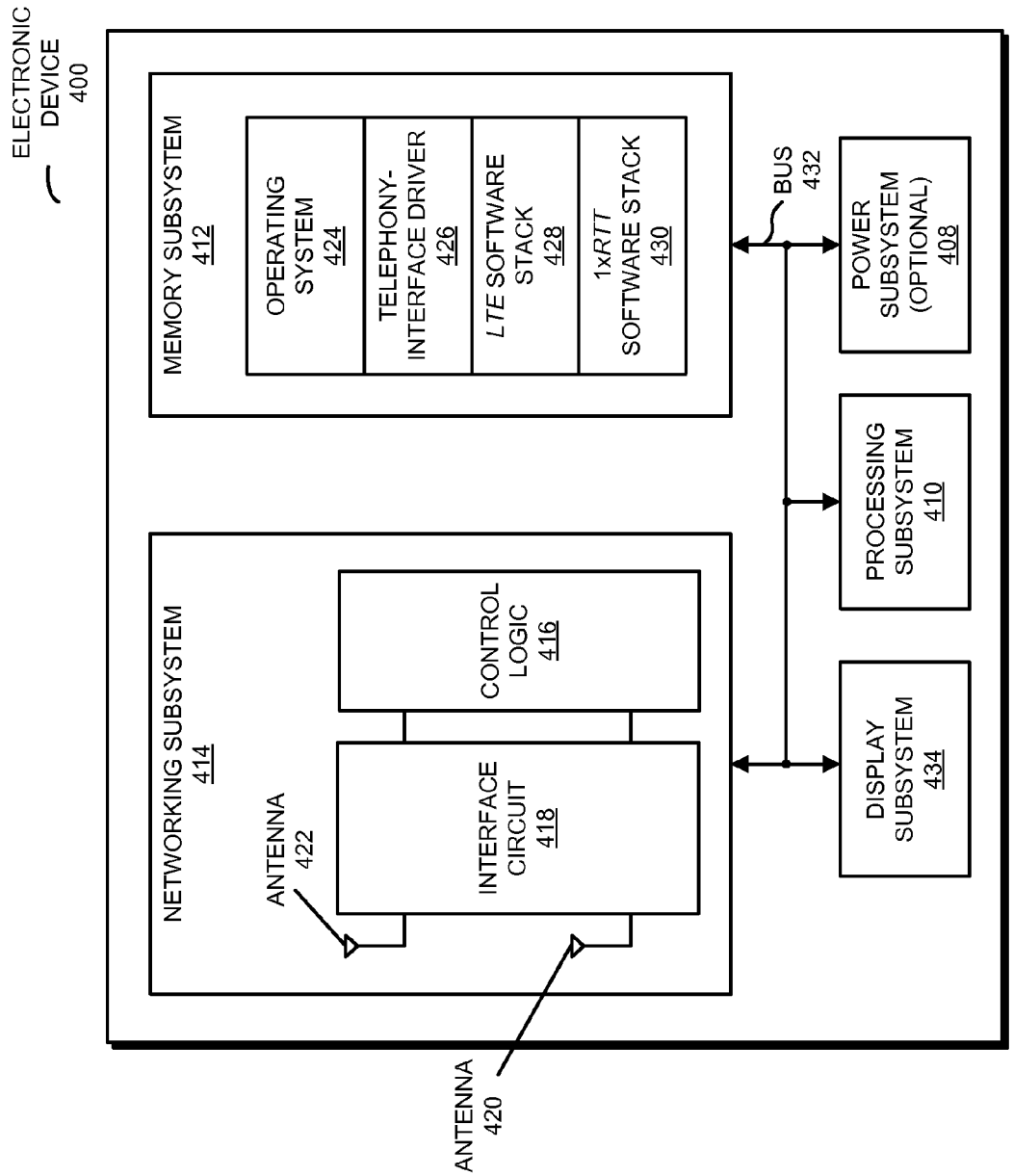
FIG. 4 is a block diagram illustrating an electronic device in accordance with an embodiment of the present disclosure.

Further detail of the communication technique in an exemplary embodiment is shown in FIG. 3, which presents a flow diagram illustrating a method 300 for managing operation of an electronic device, such as electronic device 400 (FIG. 4). During operation of the electronic device, the electronic device performs an LTE traffic/idle operation. For example, the LTE software stack periodically relinquishes the radio-frequency (RF) chain to the 1xRTT software stack for page demodulation at the 1xRTT wake-up time determined by a slot-cycle index value. Then, a call manager (implemented in software) determines whether there is an incoming 1xRTT page or a 1xRTT originating phone call. Moreover, a call-processing unit or module processes the call type based on a service option (e.g., a value in a register that specifies a phone call, a text message, or data).

If the call type specifies an SMS message, turn off the RF and partially suspend LTE resources (disable the ML1 firmware and the RRC layer). Then, tune the RF chain to 1xRTT and complete the SMS transmission or reception. After the 1xRTT SMS traffic has ended, re-tune the RF resources to LTE and turn on the ML1 firmware and the RRC layer.

Alternatively, if the call type does not specify an SMS message, turn off the RF and suspend LTE resources (disable the ML1 firmware, the RRC layer, and the NAS layer). Then, tune the RF chain to 1xRTT and complete the voice/data transmission or reception. After the 1xRTT voice/data traffic has ended, re-tune the RF resources to LTE and turn on the ML1 firmware, the RRC layer and the NAS layer.

In an exemplary embodiment, the communication technique is used with a dual-receive, single-transmit RF chain electronic devices (such as SRLTE). When sending and/or receiving a text message, such as a short-message service (SMS) message, communication using LTE may need to be suspended and the RF chain may need to be released. Then, an 1xRTT process (such as a 1xRTT software stack) may take the RF chain and may establish a traffic channel with the service option (typically, a value in a register) for an SMS message. When communication of the SMS message is completed, the 1xRTT software stack may release the RF chain so that LTE can continue a data connection.

However, if the whole LTE software stack (including NAS, RRC and ML1) is suspended before the 1xRTT software stack can establish the traffic channel, the transition may take 300-700 ms. Moreover, when the 1xRTT software stack releases the RF chain for LTE to take over, the electronic device may needs to resume the whole LTE software stack which may take another few hundreds of milliseconds.

In the communication technique described previously with reference to FIG. 2, because the duration of communication of the SMS message typically takes 5-6 sec, which is shorter than the value of the RRC dormancy timer, the electronic device may only suspend a portion of the LTE software stack, such as RRC and ML1. The electronic device (such as the program module executing on the electronic device) may detect that the service option is SMS from the 1xRTT origination event (such as an indicator that a user wants to send an SMS message) or from the incoming paging message. Note that suspension and resume of RRC and ML1 usually takes around 10-30 ms. Therefore, the electronic device can perform the transition and communicate the SMS message in less time than a suspension duration timer.

If RRC and ML1 in the LTE software stack are suspended for more than 10 sec (which may be the value of the RRC dormancy timer), the electronic device may suspend the whole LTE software stack. However, the probability of such an event is very low. Therefore, by using the communication technique, the electronic device can save several hundreds of milliseconds when suspending and resuming LTE. As a consequence, it is less likely that upper-layer applications such as file transfer protocol (FTP) and video streaming may be aborted due to full LTE-software-stack suspension. This may allow faster resumption of data transfers of user data, which will improve the user experience.

Thus, by partially disabling the LTE software stack when transitioning to and from using the 1xRTT communication protocol, the communication technique may reduce the time needed to perform these operations. In these ways, the communication technique may improve the user experience, which may improve sales of the electronic device, as well as customer retention.

In some embodiments of methods 200 (FIG. 2) and 300 (FIG. 3), there may be additional or fewer operations. Moreover, the order of the operations may be changed, and/or two or more operations may be combined into a single operation.

We now describe embodiments of the electronic device. FIG. 4 presents a block diagram illustrating an electronic device 400. This electronic device includes processing subsystem 410, memory subsystem 412, and networking subsystem 414. Processing subsystem 410 includes one or more devices configured to perform computational operations. For example, processing subsystem 410 can include one or more microprocessors, application-specific integrated circuits (ASICs), microcontrollers, programmable-logic devices, and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as telephony-interface driver 426, which may implement the communication technique), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured, to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 (such as a cellular-telephone baseband chip), antennas 420 and/or 422 coupled to interface circuit 418. For example, networking subsystem 414 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. In particular, interface circuit 418 may communicate information via a cellular-telephone network.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 400 may use the mechanisms in networking subsystem 414 for performing simple wireless communication between the electronic devices, e.g., transmitting advertising frames and/or scanning for advertising frames transmitted by other electronic devices as described previously.

As noted previously, during operation of electronic device 400, telephony-interface driver 426 (i.e., the program module) may receive the indicator that there is a message to be communicated using the 1xRTT communication protocol while electronic device 400 is currently configured to communicate using the LTE communication protocol. In response, telephony-interface driver 426 disables a portion of LTE software stack 428 and enables a 1xRTT software stack 430. Then, telephony-interface driver 426 communicates the message using the 1xRTT communication protocol. Next, after the message is communicated, telephony-interface driver 426: disables 1xRTT software stack 430 and enables the portion of LTE software stack 428.

Furthermore, electronic device 400 may include an optional power subsystem 408, such as a battery that includes one or more battery packs and/or one or more battery cells.

Within electronic device 400, optional power subsystem 408, processing subsystem 410, memory subsystem 412, and networking subsystem 414 are coupled together using bus 432. Bus 432 may include an electrical, optical, and/or electro-optical connection that the subsystems can use to communicate commands and data among one another. Although only one bus 432 is shown for clarity, different embodiments can include a different number or configuration of electrical, optical, and/or electro-optical connections between the subsystems.

In some embodiments, the electronic device includes a display subsystem 434 for displaying information on a display, which may include a display driver and the display, such as a liquid-crystal display, a touchscreen, etc.

Electronic device 400 can be (or can be included in) any electronic device with at least one network interface. For example, electronic device 400 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 400, in alternative embodiments, different components and/or subsystems may be present in electronic device 400. For example, electronic device 400 may include one or more additional processing subsystems 410, memory subsystems 412, networking subsystems 414, and/or display subsystems 434. Additionally, one or more of the subsystems may not be present in electronic device 400. For example, electronic device 400 may only include one of antennas 420 and 422, or may include additional antennas. Moreover, in some embodiments, electronic device 400 may include one or more additional subsystems that are not shown in FIG. 4. For example, electronic device 400 can include, but is not limited to, a data collection subsystem, an audio and/or video subsystem, an alarm subsystem, a media processing subsystem, and/or an input/output (I/O) subsystem. Also, although separate subsystems are shown in FIG. 4, in some embodiments, some or all of a given subsystem or component can be integrated into one or more of the other subsystems or component(s) in electronic device 400. For example, in some embodiments telephony-interface driver 426 may be included in another software application (not shown) or an operating system 424 executing on electronic device 400.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 414, such as a radio. Moreover, the integrated circuit may include hardware and/or software mechanisms that are used for transmitting wireless signals from electronic device 400 (FIG. 4) and receiving signals at electronic device 400 from other electronic devices (FIG. 4). Aside from the mechanisms herein described, radios are generally known in the art and hence are not described in detail. In general, networking subsystem 414 (FIG. 4) and/or the integrated circuit can include any number of radios. Note that the radios in multiple-radio embodiments function in a similar way to the described single-radio embodiments.

In some embodiments, networking subsystem 414 (FIG. 4) and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
    an antenna;
    an interface circuit, coupled to the antenna, configured to communicate information via a cellular-telephone network using a first communication protocol and a second communication protocol; and
    a processor;
    wherein the processor and the interface circuit perform operations for:
        receiving an indicator that there is information to be communicated using the second communication protocol while the electronic device is currently configured to communicate using the first communication protocol;
        based on a service option associated with the information to be communicated, disabling a first portion of a software stack or a second portion of the software stack associated with the first communication protocol so that the communication using the first communication protocol is discontinued, wherein the first portion of the software stack is disabled when the service option is a first value and the second portion of the software stack is disabled when the service option is a second value;
        enabling a software stack associated with the second communication protocol so that the electronic device is configured to communicate using the second communication protocol;
        communicating the information using the second communication protocol;
        disabling the software stack associated with the second communication protocol after the information is communicated so that communication using the second communication protocol is discontinued; and
        re-enabling the first portion or second portion of the software stack associated with the first communication protocol so that the electronic device is configured to communicate using the first communication protocol.

2. The electronic device of claim 1, wherein the first communication protocol includes a communication protocol compatible with a first cellular-telephone protocol.

3. The electronic device of claim 1, wherein the first communication protocol includes a Long Term Evolution (LTE).

4. The electronic device of claim 1, wherein the second communication protocol includes a communication protocol compatible with a second cellular-telephone protocol.

5. The electronic device of claim 1, wherein the second communication protocol includes 1xRadio Transmission Technology (1xRTT).

6. The electronic device of claim 1, wherein the information includes a text message.

7. The electronic device of claim 1, wherein operations in the program module are executed by the processor in less time than a channel dormancy time of the cellular-telephone network.

8. The electronic device of claim 1, wherein communicating the information involves transmitting the information; and wherein the indicator includes a command received from a user interface in the electronic device.

9. The electronic device of claim 1, wherein the electronic device further comprises a register, wherein communicating the information involves receiving the information; and wherein the indicator is a value stored in the register.

10. A computer-program product for use in conjunction with an electronic device, the computer-program product comprising a non-transitory computer-readable storage medium and a computer-program mechanism embedded therein, to facilitate management of operation of the electronic device that communicates information using a first communication protocol and a second communication protocol, the computer-program product including:

instructions for receiving an indicator that there is information to be communicated using the second communication protocol while the electronic device is currently configured to communicate using the first communication protocol;

instructions for, based on a service option associated with the information to be communicated, disabling a first portion of a software stack or a second portion of the software stack associated with the first communication protocol so that the communication using the first communication protocol is discontinued, wherein the first portion of the software stack is disabled when the service option is a first value and the second portion of the software stack is disabled when the service option is a second value;

instructions for enabling a software stack associated with the second communication protocol so that the electronic device is configured to communicate using the second communication protocol;

instructions for communicating the information using the second communication protocol;

instructions for disabling the software stack associated with the second communication protocol after the information is communicated so that communication using the second communication protocol is discontinued; and instructions for re-enabling the first portion or the second portion of the software stack associated with the first communication protocol so that the electronic device is configured to communicate using the first communication protocol.

11. The computer-program product of claim 10, wherein the first communication protocol includes a communication protocol compatible with a first cellular-telephone protocol.

12. The computer-program product of claim 10, wherein the second communication protocol includes a communication protocol compatible with a second cellular-telephone protocol.

13. The computer-program product of claim 10, wherein the information includes a text message.

14. The computer-program product of claim 10, wherein communicating the information involves transmitting the information; and wherein the indicator includes a command received from a user interface in the electronic device.

15. The computer-program product of claim 10, wherein communicating the information involves receiving the information; and wherein the indicator includes a value stored in a register.

16. A method for managing operation of an electronic device that communicates information using a first communication protocol and a second communication protocol, wherein the method comprises: receiving an indicator that there is information to be communicated using the second communication protocol while the electronic device is currently configured to communicate using the first communication protocol; based on a service option associated with the information to be communicated, disabling a first portion of a software stack or a second portion of the software stack associated with the first communication protocol so that the communication using the first communication protocol is discontinued, wherein the first portion of the software stack is disabled when the service option is a first value and the second portion of the software stack is disabled when the service option is a second value; enabling a software stack associated with the second communication protocol so that the electronic device is configured to communicate using the second communication protocol; communicating the information using the second communication protocol; disabling the software stack associated with the second communication protocol after the information is communicated so that communication using the second communication protocol is discontinued; and enabling the portion of the software stack associated with the first communication protocol so that the electronic device is configured to communicate using the first communication protocol.

17. The method of claim 16, wherein the first communication protocol includes a communication protocol compatible with a first cellular-telephone protocol.

18. The method of claim 16, wherein the second communication protocol includes a communication protocol compatible with a second cellular-telephone protocol.

19. The method of claim 16, wherein the information includes a text message.

20. The method of claim 16, wherein communicating the information involves transmitting the information; and wherein the indicator includes a command received from a user interface in the electronic device.

21. The method of claim 16, wherein communicating the information involves receiving the information; and wherein the indicator includes a value stored in a register.

* * * * *